United States Patent
Katsuki

(10) Patent No.: US 9,902,004 B2
(45) Date of Patent: Feb. 27, 2018

(54) HELICAL BROACH

(71) Applicant: MITSUBISHI HEAVY INDUSTRIES MACHINE TOOL CO., LTD., Ritto-shi, Shiga (JP)

(72) Inventor: Yasuhito Katsuki, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 140 days.

(21) Appl. No.: 14/651,395

(22) PCT Filed: Jan. 20, 2014

(86) PCT No.: PCT/JP2014/050889
§ 371 (c)(1),
(2) Date: Jun. 11, 2015

(87) PCT Pub. No.: WO2014/125872
PCT Pub. Date: Aug. 21, 2014

(65) Prior Publication Data
US 2016/0001384 A1    Jan. 7, 2016

(30) Foreign Application Priority Data

Feb. 14, 2013  (JP) ................................. 2013-026275

(51) Int. Cl.
*B23F 21/00* (2006.01)
*B23F 21/26* (2006.01)
(Continued)

(52) U.S. Cl.
CPC ............ *B23F 21/26* (2013.01); *B23D 43/005* (2013.01); *B23D 43/04* (2013.01)

(58) Field of Classification Search
CPC ...... B23D 43/00; B23D 43/005; B23D 43/04; B23D 37/16; B23D 37/05; B23D 2043/063; B23F 21/26; B23F 21/262
See application file for complete search history.

(56) References Cited

U.S. PATENT DOCUMENTS 2,060,889 A * 11/1936 Nilsson ................ B23D 43/005
407/18
2,987,801 A * 6/1961 Psenka ................... B23D 43/02
407/16
(Continued)

FOREIGN PATENT DOCUMENTS

JP     10-202422 A    8/1998
JP     2000-94215 A   4/2000
(Continued)

OTHER PUBLICATIONS

International Preliminary Report on Patentability (Forms PCT/IB/338 and PCT/IB/373) dated Aug. 27, 2015, for International Application No. PCT/JP2014/050889.
(Continued)

*Primary Examiner* — Will Fridie, Jr.
(74) *Attorney, Agent, or Firm* — Birch, Stewart, Kolasch & Birch, LLP

(57) ABSTRACT

The finishing part (4) of this helical broach (1) is formed by a first shell (20) and a second shell (30) which are divided in the axial direction, and is obtained by forming a first finishing blade (50), which comprises a prescribed gear tooth helix angle ($\alpha$) end a first blade groove helix angle ($\beta_1$), on the aforementioned first shell (20) and forming a second finishing blade (60), which comprises the aforementioned prescribed gear tooth helix angle ($\alpha$) and a second blade groove helix angle ($\beta_2$) which differs from the aforementioned first blade groove helix angle ($\beta_1$), on the aforementioned second shell (30).

4 Claims, 4 Drawing Sheets

(51) Int. Cl.
  *B23D 43/00* (2006.01)
  *B23D 43/04* (2006.01)

(56) References Cited

U.S. PATENT DOCUMENTS

| | | | | |
|---|---|---|---|---|
| 3,178,800 | A * | 4/1965 | Psenka | B23D 43/00 407/16 |
| 3,227,008 | A * | 1/1966 | Celovsky | B23D 43/00 219/69.17 |
| 3,270,395 | A * | 9/1966 | Bonnafe | B23D 43/005 407/15 |
| 5,672,035 | A * | 9/1997 | Pawlik | B23D 37/005 384/900 |
| 6,408,557 | B1 * | 6/2002 | Zaeper | B23D 43/005 42/76.1 |
| 2002/0182017 | A1 * | 12/2002 | Miller | B23D 43/04 407/13 |
| 2010/0031799 | A1 * | 2/2010 | Ast | B23B 27/06 83/875 |
| 2013/0156513 | A1 * | 6/2013 | Yoshizumi | B23D 43/005 407/13 |
| 2016/0250702 | A1 * | 9/2016 | Yamaya | B23D 43/02 |

FOREIGN PATENT DOCUMENTS

| | | |
|---|---|---|
| JP | 2007-98533 A | 4/2007 |
| JP | 2009-220261 A | 10/2009 |

OTHER PUBLICATIONS

International Search Report and Written Opinion of the International Searching Authority (Forms PCT/ISA/210, PCT/ISA/237 and PCT/ISA/220) dated Feb. 18, 2014, for International Application No. PCT/JP2014/050889 with the English translation.

* cited by examiner

HELICAL BROACH

TECHNICAL FIELD

The present invention relates to a helical broach.

BACKGROUND ART

As a working method of cutting an internal gear which is a typo of gear, there is broaching in which a broach is used as a cutting tool in which blades are arranged in a saw shape (for example, PTL 1). This is internal work performed on a workpiece by installing, in a broaching machine as a working machine dedicated to broaching, a broach and the workplace as a piece to be cut, and pulling the broach with respect to the workpiece or pulling the workplace with respect to the fixed broach.

A broach is a bar-shaped bladed material in which a large number of cutting blades are arranged to be formed in a saw shape, and the cutting blades of the broach are arranged in dimensional order such that the height and the blade width of the blades gradually increase from one end side (the leading end of the cutting direction) toward the other end side (the trailing end of the cutting direction). One of the features of the broach is that various working processes can be combined, in a single cutting tool. For example, in a case where a broach having a roughing section for roughing of the workplace and a finishing section for finishing of the workpiece is used, in the broaching machine, roughing and finishing are completed only by pulling the broach with respect to the workpiece once such that the workpiece can be forced to an internal gear.

Since broaching is performed by only pulling the workpiece or the broach once, working speed from roughing to finishing of the workpiece is faster than that of other internal work. In addition, the finished dimensions of the workpiece by broaching become substantially the same as those of the final blades (finishing blades at the rearmost end of the cutting direction) of the broach used for working, and thus cutting work can be performed with high accuracy and the repetition accuracy of the cutting work is high.

As a type of broach, there is a helical broach. This is for cutting a workplace to a helical internal gear in which the tooth lead of the internal gear is inclined with respect to the axis of the gear. The helical broach and the workplace are installed on a broaching machine and the helical broach is pulled with respect to the workplace while being rotated, thereby forming the workplace to the helical internal gear.

An example of an existing helical broach is illustrated in FIG. 4, and a method of finishing a workplace in the existing helical broach is illustrated in FIG. 5.

As illustrated in FIG. 4, a helical broach 101 includes a roughing section 103 and a finishing section 104, and roughing blades (not illustrated) in the roughing section 103 and finishing blades 150 (FIG. 5) in the finishing section 104 are arranged to be inclined with respect to the axial direction of the helical broach 101.

In the roughing blades (not illustrated) in the roughing section 103 and the finishing blades 150 in the finishing section 104, a gear tooth helix angle α is set along the tooth lead direction of the helical internal gear to be formed. In order to enhance the working accuracy and the like, in the finishing blades 150 in the finishing section 104, a blade groove helix angle β may further be set.

In addition, the blade groove helix angle β is set to a direction that is not perpendicular to the direction of the gear tooth helix angle α in order to enhance the working accuracy and the like. Therefore, as illustrated in FIG. 5, one end portion 151 (upper left portion in FIG. 5) in the finishing blade 150 has an acute angle, and the other end portion 152 (lower left portion in FIG. 5) has an obtuse angle.

In addition, in order to enhance the working accuracy and the like, in the finishing section 104 of the helical broach 101, a single finishing blade 150 is set to abut and cut only one of tooth surfaces including a left tooth surface 170 in a work-piece W (one tooth surface along the tooth lead of the workpiece W) and a right tooth surface 180 (the other tooth surface along the tooth lead of the workpiece W). That is, the finishing blades 150 in the finishing section 104 of the helical broach 101 are formed to be divided into left tooth surface finishing blades 150a which cut only the left tooth surfaces 170 in the workplace W and right tooth surface finishing blades 150b which cut only the right tooth surfaces 180 in the workpiece W.

Therefore, the left tooth surface finishing blade 150a performs cutting by allowing an acute angle portion 151 to abut the left tooth surface 170 in the workpiece W, and the right tooth surface finishing blade 150b performs cutting by allowing an obtuse angle portion 152 to abut the right tooth surface 180 in the workpiece W.

CITATION LIST

Patent Literature

[PTL 1] Japanese Patent Application Publication No. 2009-220261

SUMMARY OF INVENTION

Technical Problem

However, in a case where the tooth surface (the right tooth surface 180 in FIG. 5) of the workpiece W is cut by the obtuse angle portion 152, the surface roughness of the cut surface is increased compared to a case where the tooth surface (the left tooth surface 170 in FIG. 5) of the workpiece W is cut by the acute angle portion 151. Therefore, a cutting amount $d_2$ (the amount of the tooth surface of the workpiece W being cut by each blade) with which the obtuse angle portion 152 performs cutting has to be set to be smaller than a cutting amount $d_1$ with which the acute angle 151 performs cutting. Accordingly, in order to cut equal amounts of the left tooth surface 170 and the right tooth surface 180 of the workpiece W, the number of blades of the obtuse angle portion 152 needs to be greater than the number of blades of the acute angle portion 151. This results in an increase in the axial length of the finishing section 104, that is, a shell 120, and thus causes an increase in the size of the tool and the working machine and an increase in the manufacturing cost.

The present invention has been made by taking the foregoing problems into consideration, and an object thereof is to reduce the axial length of a finishing section by allowing no difference in the cutting accuracy between a right tooth surface and a left tooth surface of a workpiece which is a piece to be cut, during broaching by a helical broach.

Solution to Problem

A helical broach according to a first invention to solve the problems is a helical broach including: a cylindrical shell in which finishing blades having a predetermined gear tooth helix angle are formed on an outer peripheral side, in which the shell includes a first shell and a second shell which are divided in an axial direction, a first finishing blade having the gear tooth helix angle and a first blade groove helix angle is formed in the first shell, and a second finishing blade having the gear tooth helix angle and a second blade groove helix angle which is different from the first blade groove helix angle is formed in the second shell.

A helical broach according to a second invention to solve the problems is the helical broach according to the first invention, in which the first finishing blade cuts one tooth surface along a tooth lead in a piece to be cut, and the second finishing blade cuts the other tooth surface along the tooth lead in the piece to be cut.

A helical broach according to a third invention to solve the problems is the helical broach according to the first or second invention, in which both of a rake angle of the first finishing blade and a rake angle of the second finishing blade are an acute angle.

Advantageous Effects of Invention

According to the helical broach according to the first invention, since the shell has the structure divided into the first shell and the second shell, the finishing blades having different gear tooth helix angles can be formed in the single helical broach. For example, the first finishing blade in the first shell has an appropriate shape to cut one surface in the piece to be cut, and the second finishing blade in the second shell has an appropriate shape to cut the other surface in the piece to be cut such that the finishing blades that match the surfaces of the piece to be cut can be formed.

According to the helical broach according to the second invention, since the first finishing blade in the first shell cuts one surface in the piece to be cut and the second finishing blade in the second shell cuts the other surface in the piece to foe cut, the finishing blades that match the surfaces of the piece to be cut can be formed. For example, the finishing blades having an appropriate acute angle for the cutting perform cutting while abutting a right tooth surface and a left tooth surface of the piece to be cut, and thus the working accuracy and the surface roughness of the cut surface of the piece to be cut can be enhanced.

According to the helical broach according to the third invention, since the right tooth surface and the left tooth surface of the piece to be cut are cut by the finishing blades having an appropriate acute angle for the cutting, the working accuracy and the surface roughness of the cut surface of the piece to be cut can be enhanced. In addition, the tooth surfaces of the piece to be cut are not cut by finishing blades having an obtuse angle which is not appropriate for the cutting. Accordingly, there is no need to reduce cutting amounts unlike the related art and the cutting amounts of the finishing blades can be set to be sufficiently large. Therefore, the axial lengths of the shell in which the first shell and the second shell are assembled, and the finishing section can be reduced, and thus the tool and the working machine can also be reduced in size, thereby reducing the manufacturing cost.

DESCRIPTION OF EMBODIMENTS

Hereinafter, an embodiment of a helical broach according to the present invention will be described in detail with reference to the accompanying drawings. As a matter of course, the present invention is not limited to the following embodiment, and it is natural that various modifications can be made without departing from the spirit of the present invention.

Embodiment 1

Figure 1:
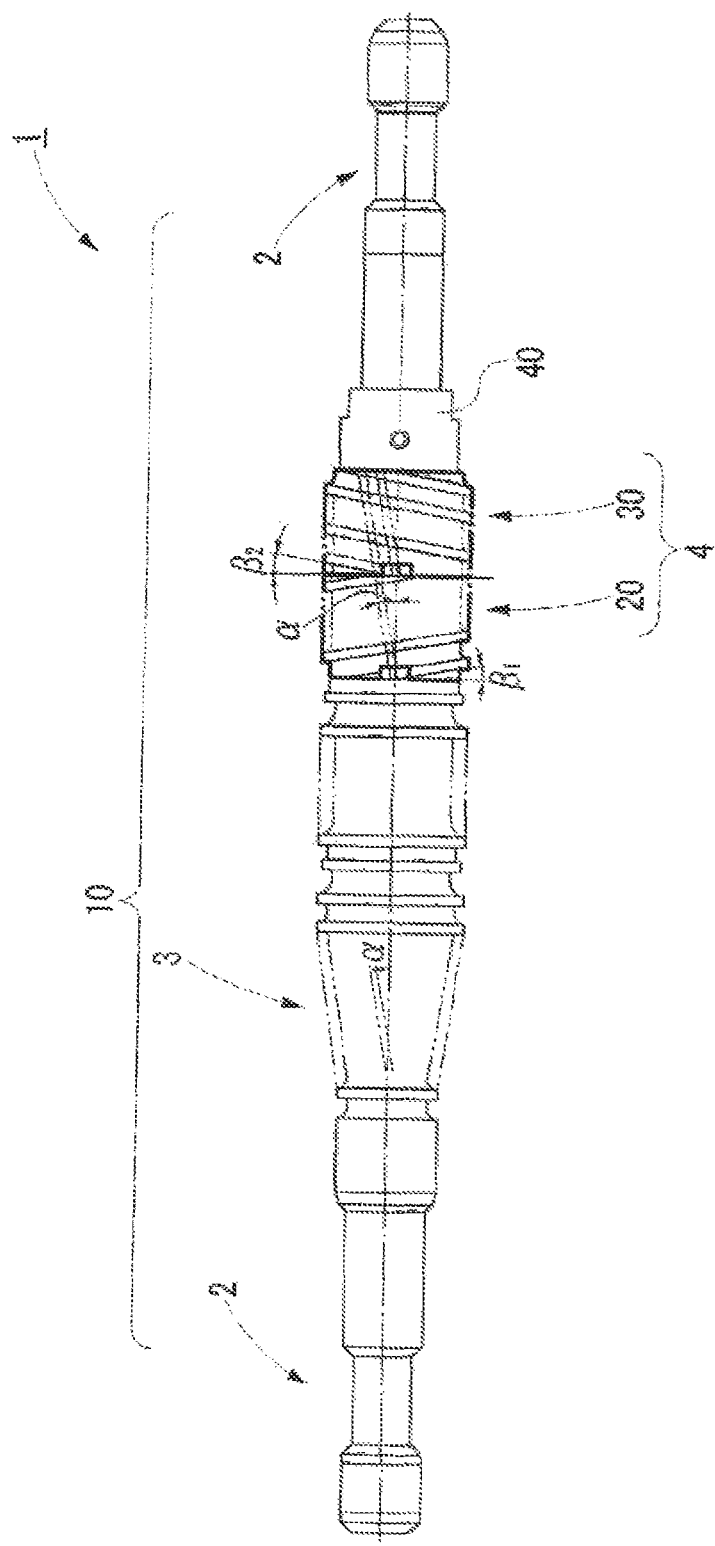
FIG. 1 is a side view illustrating a helical broach according to Embodiment 1.
Figure 2:
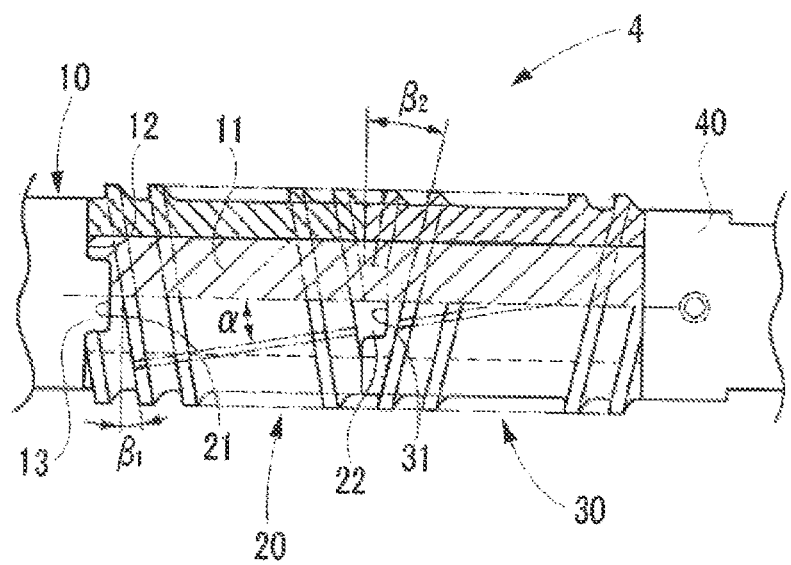
FIG. 2 is a side view and a longitudinal sectional view illustrating shells of the helical broach of Embodiment 1.

First, the structure of the helical broach according to Embodiment 1 of the present invention will be described with reference to FIGS. 1 to 3.

A helical broach 1 according to this embodiment is a cutting tool for forming a substantially cylindrical workpiece W which is a piece to be cut, to a helical internal gear having a gear tooth helix angle $\alpha$. As illustrated in FIG. 1, the helical broach 1 includes a shank section 2 to be installed in a broaching machine (not illustrated), a roughing section 3 for roughing of the workpiece W, and a finishing section 4 for finishing of the rough-worked workpiece W and is formed by assembling a first shell 20 and a second shell 30 included in the finishing section 4 to a broach body 10 having the shank section 2 and the roughing section 3.

The roughing section 3 is formed integrally with the broach body 10 such that roughing blades having a gear tooth helix angle $\alpha$ protrude toward the outer peripheral side of the helical broach 1 in a radial direction. In addition, in order to form teeth having predetermined dimensions in the workplace W, the roughing blades are arranged such that the height of the blades gradually increases from the leading end of the cutting direction toward the trailing end of the cutting direction.

Each of the first shell 20 and the second shell 30 in the finishing section 4 forms a substantially cylindrical shape. As illustrated in FIG. 2, the first shell 20 and the second shell 30 are arranged in an axial direction of the helical broach 1, are engaged with a shell engagement portion 11 of the broach body in, and are assembled such that the first shell 20 abuts a shell abutting surface 12 of the broach body 10 and the second shell 30 is pressed toward the leading end (the left side in FIG. 2) of the cutting direction by a fastener 40 together with the first shell 20. In addition, the fastener 40 is fixed to the broach body 10 by a bolt (not illustrated) or the like.

In order to relatively align the phases in a peripheral direction (around the axis of the helical broach 1) of the broach body 10 and the first and second shells 20 and 30 in the helical broach 1, a positioning protrusion 13 is provided in the shell abutting surface 12, a positioning groove 21 is provided in one end (the left end in FIG. 2) of the first shell 20, a positioning protrusion 22 is provided in the other end (the right end in FIG. 2) of the first shell 20, and a positioning groove 31 is provided in one end (the left end in FIG. 2) of the second shell 30.

The first shell 20 and the second shell 30 are assembled to the broach body 10 in a state in which positioning protrusion 13 of the shell abutting surface 12 and the positioning groove 21 of the first shell 20 are fitted to each other and the positioning protrusion 22 of the first shell 20 and the positioning groove 31 of the second shell 30 are fitted to each other, that is, in a state in which the phases are relatively aligned with each other.

Figure 3:
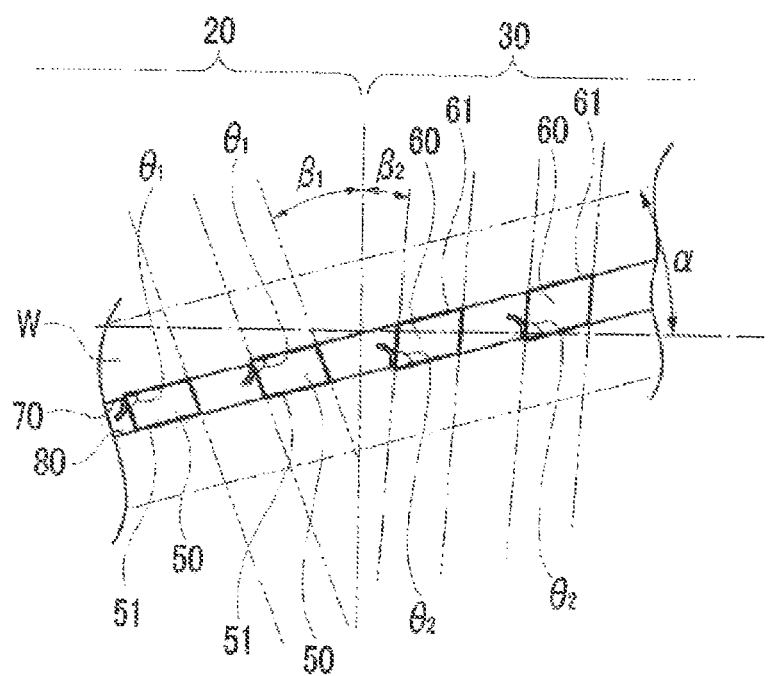
FIG. 3 is an explanatory view illustrating finishing by the helical broach according to Embodiment 1.
Figure 4:
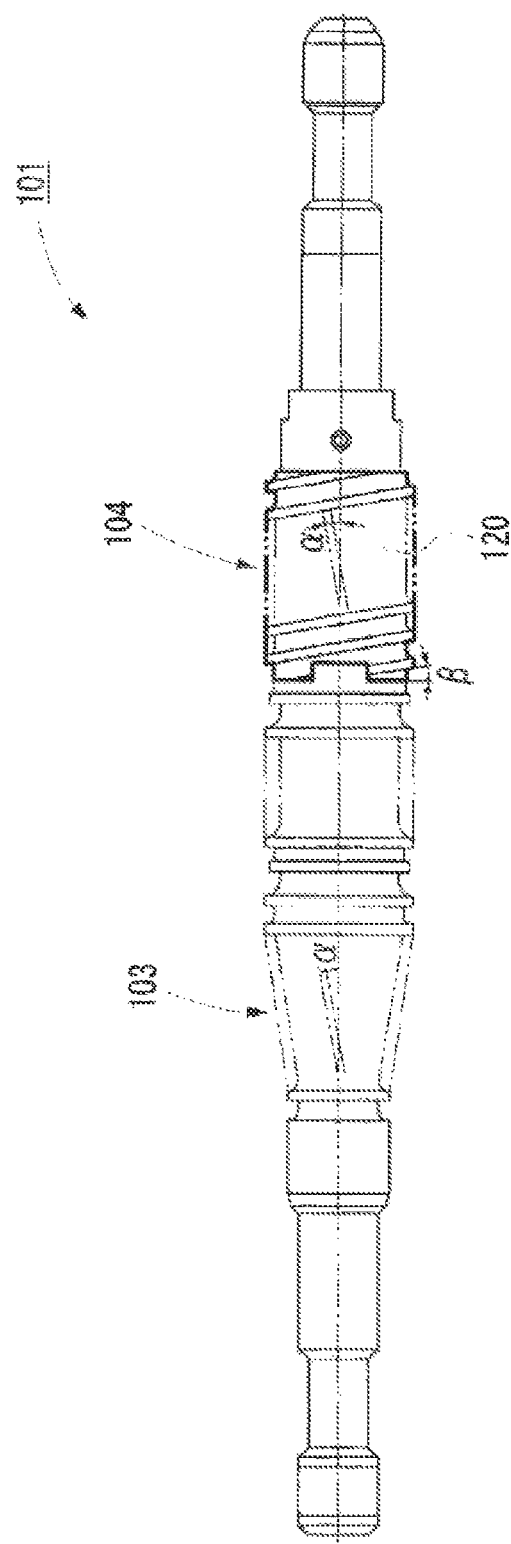
FIG. 4 is a side view illustrating an example of an existing helical broach.

In this embodiment, since the finishing section 4 has a structure divided into the first shell 20 and the second shell 30, the first shell 20 and the second shell 30 included in the finishing section 4 may be formed with different finishing blades 50 and 60 (FIG. 3).

As illustrated in FIG. 3, in this embodiment, in the finishing blades 50 of the first shell 20, a cutting amount $d_1$ is set to cut only the left tooth surface 70 (one tooth surface along the tooth lead of the workpiece W) in the workpiece W, and a blade groove helix angle $\beta_1$ is set with respect to a direction perpendicular to the axis of the first shell 20 so as to allow a tool angle $\theta_1$ with which the left tooth surface 70 in the workpiece W is cut to be an acute angle. In the finishing blades 60 of the second shell 30, a cutting amount $d_2$ is set to cut only a right tooth surface 80 (the other tooth surface along the tooth lead of the workpiece W) in the workpiece W, and a blade groove helix angle $\beta_2$ is set with respect to a direction perpendicular to the axis of the second shell 30 so as to allow a tool angle $\theta_2$ with which the right tooth surface 80 in the workpiece W is cut, to be an acute angle.

That is, in this embodiment, the first shell 20 is a shell for the left tooth surface, in which the finishing blades 50 that cut only the left tooth surface 70 in the workpiece W at the tool angle $\theta_1$ which is an acute angle are provided, and the second shell 30 is a shell for the right tooth surface, in which the finishing blades 60 that cut only the right tooth surface 80 in the workpiece W at the tool angle $\theta_2$ which is an acute angle are provided.

In order to form each of the left tooth surface 70 and the right tooth surface 80 in the workpiece W to predetermined dimensions, the finishing blades 50 in the first shell 20 and the finishing blades 60 in the second shell 30 are formed to be arranged such that the width of the blades gradually increases from the leading end of the cutting direction toward the trailing end of the cutting direction.

In general, in the working blades of a cutting tool, a cutting portion having an acute angle has a higher cutting ability than that of those having an obtuse angle and enables cutting with good surface roughness for cut surfaces.

Therefore, in this embodiment, the blade groove helix angle $\beta_1$ is set to allow the tool angle $\theta_1$ with which the finishing blades 50 in the first shell 20 cut the left tooth surface 70 in the workpiece W to be an acute angle, and the blade groove helix angle $\beta_2$ is set to allow the tool angle $\theta_2$ with which the finishing blades 60 in the second shell 30 cut the right tooth surface 80 in the workpiece W to be an acute angle.

The finishing blades 50 in the first shell 20 abut the left tooth surface 70 in the workpiece W with the cutting amount $d_1$ and have guide surfaces 51 that abut the right tooth surface 80 in the workplace W. Since the guide surfaces 51 are provided in the finishing blades 50, the finishing blades 50 are prevented from wobbling toward the right tooth surface 80 in the workpiece W due to the cutting reaction force when cutting the left tooth surface 70 in the workpiece w and thus can accurately cut the left tooth surface 70 in the workpiece W only with the cutting amount $d_1$.

The finishing blades 60 in the second shell 30 abut the right tooth surface 80 in the workpiece W with the cutting amount $d_2$ and have guide surfaces 61 that abut the left tooth surface 70 in the workpiece W. Since the guide surfaces 61 are provided in the finishing blades 60, the finishing blades 60 are prevented from wobbling toward the left tooth surface 70 in the workpiece W due to the cutting reaction force when cutting the right tooth surface 80 in the workpiece W and thus can accurately cut the right tooth surface 80 in the workpiece W only with the cutting amount $d_2$.

In addition, the finishing blades 50 and 60 are subjected to work such as chamfering (not illustrated) so as not to allow the guide surfaces 51 and 61 to cut the right tooth surface 80 and the left tooth surface 70 in the workpiece W.

Next, finishing by the helical broach according to Embodiment 1 of the present invention will be described with reference to FIGS. 1 to 3.

The helical, broach 1 according to Embodiment 1 of the present invention and the workpiece W are installed in the broaching machine (not illustrated), and when the helical broach 1 is moved in the axial direction while being pulled with respect to the workpiece W, the workpiece W can be formed to a helical internal gear as described below.

First, the roughing blades (not illustrated) in the roughing section 3 of the helical broach 1 come into contact with the inner peripheral surface of the substantially cylindrical workpiece W. By the roughing blades arranged such that the height of the blades gradually increases from the leading end of the cutting direction toward the trailing end of the cutting direction, teeth having predetermined dimensions are formed in the workpiece W.

Subsequently, the finishing blades 50 in the first shell 20 positioned at the leading end of the cutting direction in the finishing section 4 of the helical broach 1 come into contact with the left tooth surface 70 and the right tooth surface 80 in the workpiece W subjected to roughing. The finishing blades 50 abut the left tooth surface 70 in the workpiece W with the cutting amount $d_1$, and the guide surfaces 51 of the finishing blades 50 abut the right tooth surface 80 in the workpiece W.

Since the guide surfaces 51 of the finishing blades 50 abut the right tooth surface 80 in the workpiece W, the finishing blades 50 are prevented from wobbling toward the right tooth surface 80 in the workpiece W due to the cutting reaction force when cutting the left tooth surface 70 in the workpiece W and thus can accurately cut the left tooth surface 70 in the workpiece W only with the cutting amount $d_1$. By the finishing blades 50 that are arranged such that the width of the blades gradually increases from the leading and of the cutting direction toward the trailing end of the cutting direction, the left tooth surface 70 in the workpiece W are cut to predetermined finished dimensions.

Subsequently, the finishing blades 60 in the second shell 30 positioned at the trailing end of the cutting direction in the finishing section 4 of the helical broach 1 come into contact with the left tooth surface 70 subjected to finishing and the right tooth surface 80 subjected to roughing in the workpiece W. The finishing blades 60 abut the right tooth surface 80 in the workpiece W with the cutting amount $d_2$, and the guide surfaces 61 of she finishing blades 60 abut she left tooth surface 70 in the workpiece W.

Since the guide surfaces 61 of the finishing blades 60 abut the left tooth surface 70 in the workpiece W, the finishing blades 60 are prevented from wobbling toward the left tooth surface 70 in the workpiece W due to the cutting reaction force when cutting the right tooth surface 80 in the workpiece W and thus can accurately cut the right tooth surface 80 in the workpiece W only with the cutting amount $d_2$. By the finishing blades 60 that are arranged such that the width of the blades gradually increases from the leading end of the cutting direction toward the trailing end of the cutting direction, the right tooth surface 80 in the workpiece W are cut to predetermined finished dimensions.

As described above, by broaching using the helical broach 1 according to Embodiment 1 of the present invention, the left tooth surface 70 and the right tooth surface 80 in the workpiece W are accurately cut to predetermined finished dimensions, thereby forming a helical internal gear having high accuracy.

Since the finishing blades 50 having the blade groove helix angle $\beta_1$ with respect to the gear tooth helix angle $\alpha$ are formed in the first shell 20, the tool angle $\theta_1$ of the finishing blades 50 is an acute angle. Accordingly, the cutting ability of the finishing blades 50 in the first shell 20 is high, and the surface roughness of the surface cut by the finishing blades 50 is enhanced. Therefore, the cutting amount $d_1$ of the left tooth surface 70 in the workpiece W by the finishing blades 50 in the first shells 20 can be set to be sufficiently large.

Since the finishing blades 60 having the blade groove helix angle $\beta_2$ with respect to the gear tooth helix angle $\alpha$ are formed in the second shell 30, the tool angle $\theta_2$ of the finishing blades 60 is an acute angle. Accordingly, the cutting ability of the finishing blades 60 in the second shell 30 is high, and the surface roughness of the surface cut by the finishing blades 60 is enhanced. Therefore, the cutting amount $d_2$ of the right tooth surface 80 in the workpiece W by the finishing blades 60 in the second shells 30 can be set to be sufficiently large as in the first shell 20.

Figure 5:
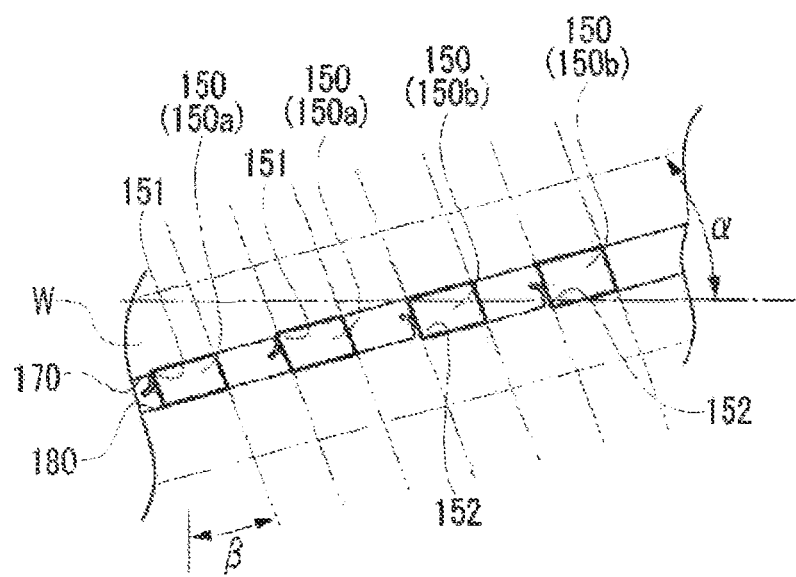
FIG. 5 is an explanatory view illustrating an example of finishing by the existing helical broach.

In the related art, as illustrated in FIG. 5, one tooth surface (the left tooth surface 170 in FIG. 5) of the left tooth surface 170 and the right tooth surface 180 in the workpiece W is cut by the acute angle portion 151 (a portion having an acute tool angle) of the finishing blade 150 in the shell 120, and the other tooth surface (the right tooth surface 180 in FIG. 5) is cut by the obtuse angle portion 152 (a portion having an obtuse tool angle) of the finishing blade 150 in the shell 120. Therefore, the surface roughness of the surface cut by the obtuse angle portion 152 is coarse, and thus the cutting amount d cannot be set to be sufficiently large. Accordingly, the number of blades of the obtuse angle portion 152 is set to be larger than the number of blades of the acute angle portion 151. That is, the number of blades of the obtuse angle portion 152 is larger than the number of blades of the acute angle portion 151, and thus the finishing section 104, that is, the shell 120 is elongated in the axial direction.

In the helical broach 1 according to this embodiment, as illustrated in FIG. 3, the left tooth surface 70 and the right tooth surface 80 in the workpiece W are cut by the finishing blades 50 in which the tool angle $\theta_1$ is an acute angle in the first shell 20 and by the finishing blades 60 in which the tool angle $\theta_2$ is an acute angle in the second shell 30. Therefore, the surface roughness of the surface cut by the finishing blades 50 and 60 is good and the cutting amounts $d_1$ and $d_2$ can be set to be sufficiently large. Accordingly, the axial length of the finishing section 4, that is, the first shell 20 and the second shell 30 can be smaller than the axial length of the existing shell 120.

REFERENCE SIGNS LIST

1 HELICAL BROACH
2 SHANK SECTION
3 ROUGHING SECTION
4 FINISHING SECTION
10 BROACH BODY
11 SHELL ENGAGEMENT PORTION OF BROACH BODY
12 SHELL ABUTTING SURFACE OF BROACH BODY
13 POSITIONING PROTRUSION OF BROACH BODY
20 FIRST SHELL
21 POSITIONING GROOVE OF FIRST SHELL
22 POSITIONING PROTRUSION OF FIRST SHELL
30 SECOND SHELL
31 POSITIONING GROOVE OF SECOND SHELL
40 FASTENER
50 FINISHING BLADE IN FIRST SHELL
51 GUIDE SURFACE
60 FINISHING BLADE IN SECOND SHELL
61 GUIDE SURFACE
70 LEFT TOOTH SURFACE IN WORKPIECE
80 RIGHT TOOTH SURFACE IN WORKPIECE

The invention claimed is:

1. A helical broach comprising:
a cylindrical shell in which finishing blades having a predetermined gear tooth helix angle are formed on an outer peripheral side,
wherein the shell includes a first shell and a second shell which are divided in an axial direction,
in the first shell, a first finishing blade having the gear tooth helix angle and a first blade groove helix angle is formed, and
in the second shell, a second finishing blade having the gear tooth helix angle and a second blade groove helix angle which is different from the first blade groove helix angle is formed;
wherein the diameters of the first and second finishing blades in said first and second shells are substantially constant in the axial direction.

2. The helical broach according to claim 1,
wherein the first finishing blade cuts one tooth surface along a tooth lead in a piece to be cut, and
the second finishing blade cuts the other tooth surface along the tooth lead in the piece to be cut.

3. The helical broach according to claim 1,
wherein both of a tool angle of the first finishing blade and a tool angle of the second finishing blade are an acute angle.

4. The helical broach according to claim 2,
wherein both of a tool angle of the first finishing blade and a tool angle of the second finishing blade are an acute angle.

* * * * *